United States Patent
De Pauw et al.

(10) Patent No.: US 8,954,859 B2
(45) Date of Patent: Feb. 10, 2015

(54) VISUALLY ANALYZING, CLUSTERING, TRANSFORMING AND CONSOLIDATING REAL AND VIRTUAL MACHINE IMAGES IN A COMPUTING ENVIRONMENT

(75) Inventors: Wim De Pauw, Scarborough, NY (US); Glenn Ammons, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 13/289,176

(22) Filed: Nov. 4, 2011

(65) Prior Publication Data

US 2013/0117676 A1    May 9, 2013

(51) Int. Cl.
*G06F 3/00* (2006.01)
*G06F 17/30* (2006.01)
*G06F 9/445* (2006.01)
*G06F 9/455* (2006.01)

(52) U.S. Cl.
CPC ............ *G06F 3/00* (2013.01); *G06F 17/30713* (2013.01); *G06F 8/63* (2013.01); *G06F 17/30705* (2013.01); *G06F 8/65* (2013.01); *G06F 17/30572* (2013.01); *G06F 9/45558* (2013.01); *G06F 2009/45562* (2013.01); *G06F 2009/4557* (2013.01); *G06F 2009/45575* (2013.01); *G06F 2009/45591* (2013.01)
USPC .......................................................... 715/738

(58) Field of Classification Search
CPC .................. G06F 8/60–8/68; G06F 8/70–8/71
USPC .......................................................... 715/738
See application file for complete search history.

(56) References Cited

U.S. PATENT DOCUMENTS 6,424,971 B1 * 7/2002 Kreulen et al. ............... 707/737
6,934,636 B1   8/2005 Skierczynski et al.
(Continued)

OTHER PUBLICATIONS

Jin Chen; MacEachren, A.M.; Peuquet, D.J., "Constructing Overview + Detail Dendrogram—Matrix Views," Visualization and Computer Graphics, IEEE Transactions on, vol. 15, No. 6, pp. 889,896, Nov.-Dec. 2009 doi: 10.1109/TVCG.2009.130.*
Internet article "MG-RAST analysis tools" published on or before Apr. 5, 2011 per Internet Archive Wayback Machine capture. URL: http://blog.metagenomics.anl.gov/howto/mg-rast-analysis-tools/.*

(Continued)

*Primary Examiner* — Tuyetlien Tran
*Assistant Examiner* — Patrick Ramsey
(74) *Attorney, Agent, or Firm* — Scully, Scott, Murphy & Presser, P.C.; Preston Young, Esq.

(57) ABSTRACT

System, method and computer program product for generating a GUI that facilitates the management of real and/or virtual images on computing machines in a computing environment. The system and method provides for an interactive visualization of virtual images (machines) and the software components included in each virtual image or real image. According to a consolidating and clustering processes, the images are bundled and displayed in a dendogram to show a hierarchy of the similarity between images. Further, software components are represented by small coded cells and organized into logical groupings. The system and method provides for user interactive functionality that facilitates the gathering of details on certain aspects of the images and/or components. The end result is a software program that facilitates user's ability to consolidate and manage real and virtual images.

23 Claims, 14 Drawing Sheets

(56) References Cited

U.S. PATENT DOCUMENTS

| | | | |
|---|---|---|---|
| 7,203,864 B2* | 4/2007 | Goin et al. | 714/26 |
| 8,046,692 B2* | 10/2011 | Pogrebinsky et al. | 715/735 |
| 8,352,930 B1* | 1/2013 | Sebes et al. | 717/168 |
| 8,364,651 B2* | 1/2013 | Howey | 707/692 |
| 2004/0167906 A1* | 8/2004 | Smith et al. | 707/100 |
| 2005/0262194 A1* | 11/2005 | Mamou et al. | 709/203 |
| 2008/0307414 A1 | 12/2008 | Alpern et al. | |
| 2009/0113327 A1* | 4/2009 | Pogrebinsky et al. | 715/765 |
| 2011/0047133 A1 | 2/2011 | Alpern et al. | |
| 2011/0055310 A1* | 3/2011 | Shavlik et al. | 709/202 |
| 2011/0197053 A1 | 8/2011 | Yan et al. | |
| 2011/0225506 A1 | 9/2011 | Casalaina et al. | |
| 2011/0225574 A1 | 9/2011 | Khalidi et al. | |
| 2012/0081395 A1* | 4/2012 | Adi et al. | 345/634 |
| 2013/0106860 A1* | 5/2013 | De Pauw et al. | 345/440 |
| 2013/0106896 A1* | 5/2013 | De Pauw et al. | 345/589 |
| 2013/0246422 A1* | 9/2013 | Bhargava et al. | 707/737 |

OTHER PUBLICATIONS

The History of the Cluster Heat Map, Leland Wilkinson and Michael Friendly, The American Statistician, 2009, vol. 63, issue 2, pp. 179-184.*

Mietzner et al. "A Method and Implementation to Define and Provision Variable composite Applications, and its Usage in Cloud Computing," Institut fur Architektur von Anwendungssystemen der Universitat Stuttgart, Jul. 13, 2010, pp. 1-369.

Sun et al., "Simplifying Service Deployment with Virtual Appliances," 2008 IEEE International Conference on Services Computing, pp. 265-272.

Konstantinou et al., "An Architecture for Virtual Solution Composition and Deployment in Infrastructure Clouds," VTDC'09K Jun. 15, 2009, Barcelona, Spain, pp. 9-17.

Sethi et al., "Rapid Deployment of SOA Solutions via Automated Image Replication and Reconfiguration," 2008 IEEE International Conference on Services Computing, pp. 155-162.

* cited by examiner

VISUALLY ANALYZING, CLUSTERING, TRANSFORMING AND CONSOLIDATING REAL AND VIRTUAL MACHINE IMAGES IN A COMPUTING ENVIRONMENT

FIELD

The present application generally relates to computer systems and more particularly to a system and method for visually analyzing, clustering, transforming and consolidating images on physical computing machines or virtual (e.g., file-system, disk) images in cloud image repositories of a cloud computing environment.

BACKGROUND

A cloud computing environment provides computation, software, data access, and storage services. Cloud computing describes a new supplement, consumption, and delivery model for Information Technology (IT) services based on Internet protocols, and it typically involves provisioning of dynamically scalable and often virtualized resources.

Cloud computing providers deliver applications via the internet, which are accessed from web browsers, desktop and mobile apps. All software, e.g., business software, applications and data are stored on servers at a remote location (e.g., a computing data center).

As known, "virtual" and "cloud computing" concepts includes the utilization of a set of shared computing resources (e.g., servers) which are typically consolidated in one or more data center locations. For example, cloud computing systems may be implemented as a web service that enables a user to launch and manage computing resources (e.g., virtual server instances) in third party data centers.

Different computing resources may be created within a cloud computing infrastructure or data center. For example, a resource may include all the components necessary to run application software, and may include, e.g., UNIX, Linux, or Windows operating systems (O/S), middleware, and specific application software or data, as desired by a user. The information for configuring the resource to be created is referred to as an image. After an image has been created (instantiated), the resource becomes an instance (a server instance).

It is the case that migrating software stacks from a "physical" to a "virtual" environment provides an opportunity to standardize the software components that are used. As data centers may host hundreds or thousands of hosts, e.g., servers (HTTP/Web-servers, database servers, developer servers, etc) containing OS, middleware and other software components, making an inventory and understanding how all these software components are used is a challenge. For example, in large data centers there may multiple servers having images including different versions and/or customizations of the same software application/package.

It becomes a further challenge to partition hosts (or their virtual images) into groups with a similar set of software such that each of those groups can then be transformed into a more standardized set of software.

To perform this kind of analysis for a data center or current cloud computing infrastructure is very labor intensive and error prone, especially since the number of hosts (or virtual "images") and the software components they contain can be large.

Further, analysis problems may occur after migration, in normal operation or during "steady state". In steady state, the operators need to find groups of images that share vulnerability to a virus, share some bug, etc., such that they must all be upgraded with a new feature, or could be aggregated or otherwise simplified.

While tools exist that make an inventory of the software in an environment: e.g. Tivoli Application Dependency Discovery Manager (TADDM) or Mirage™ (both systems available from current Assignee International Business Machines Corporation), these inventories and the user interfaces to them focus on individual machines or images. It is not easy for users to find similarities between environments.

In the area of data mining in particular, matrix visualizations and clusters do not provide the operations specific for image transformations.

BRIEF SUMMARY

There is provided a system, method and computer program product that provides a graphical tool to facilitate a user's understanding, transforming, and standardizing software stacks. The graphical tool helps the user by showing the results of an automatic clustering analysis, suggesting how to transform the discovered software.

The graphical tool provides a graphical representation that generates and shows proposed clusters that indicates user-selectable candidates for "golden masters" (i.e., standard images from which specialized images that consolidate the functionality of existing machines or virtual images), i.e., the user (e.g., an IT specialist) can interact with the tool to modify the clustering, facilitated by "software compatibility and merging" heuristics.

Thus, in one aspect there is provided a method, system and computer program product for visualizing data associated with a cloud environment that comprises: receiving data about images on computing machines or virtual images in cloud image repositories; receiving data about software components configured on the images; forming, from received data, a data structure that maps all images and configured software components on each image; generating, using a processor unit, a visualization interface of the data mapping on a display device in which images are represented visually along a first dimension of a matrix and software components are represented visually along a second dimension of the matrix; interacting, via a displayed visualization interface, to display information from the visualization data used for consolidating software components and images in the cloud environment.

Further to this aspect, the method further comprises: determining similarities between images on a first axis and similarities between software components on a second axis; and modifying visualizing of images in a first dimension and modifying visualization of software components in a second dimension based on said determined similarities.

The method further comprises: forming, for said visualization, one or more dendograms in each dimension of said interface including one or more dendograms indicating a degree of similarity between images in said first dimension, and one or more dendograms indicating a similarity between software components in said second dimension.

In a further aspect, there is provided a system for visualizing data associated with a cloud environment comprising: a memory storage device; a processor unit in communication with the memory storage device configured to perform a method to: receive data about images on computing machines or virtual images in cloud image repositories; receive data about software components configured on the images; form, from received data, a data structure that maps all images and configured software components on each image; generating a visualization interface of the data mapping on a display device in which images are represented visually along a first dimension of a matrix and software components are represented visually along a second dimension of the matrix; receive user commands via interactions with the displayed visualization interface, to extract information from the visualization data for use in further consolidating software components and images in the cloud environment.

In another aspect, there is further provided a data visualization tool comprising: a memory storage device for storing first data representing images on computing machines or virtual images in cloud image repositories and storing second data about software components configured on the images; a processor device in communication with the memory storage device for forming, from the stored data, a data structure that maps all images and configured software components on each image, the processor device generating, from the stored data, a visualization interface for mapping the stored data on a display device in which images are represented visually along a first dimension of a matrix and software components are represented visually along a second dimension of the matrix; the visualization interface including cell components located at intersections that map a particular image configured with a particular software component; and the visualization interface further including one or more dendograms indicating a degree of similarity between images in the first dimension, and one or more dendograms indicating a similarity between software components in the second dimension; a device for initiating, via the interface, user interactions with displayed cell components or visual components of the one or more dendograms, the processor device causing display of detailed information useful for consolidating software components and images in the cloud environment responsive to the user interactions, and, the processor device further effecting a compression of images along the first dimension and software components along the second dimension responsive to the user interactions.

Further to the data visualization tool the compression of images along the first dimension and software components along the second dimension includes a lossy compression or lossless compression.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
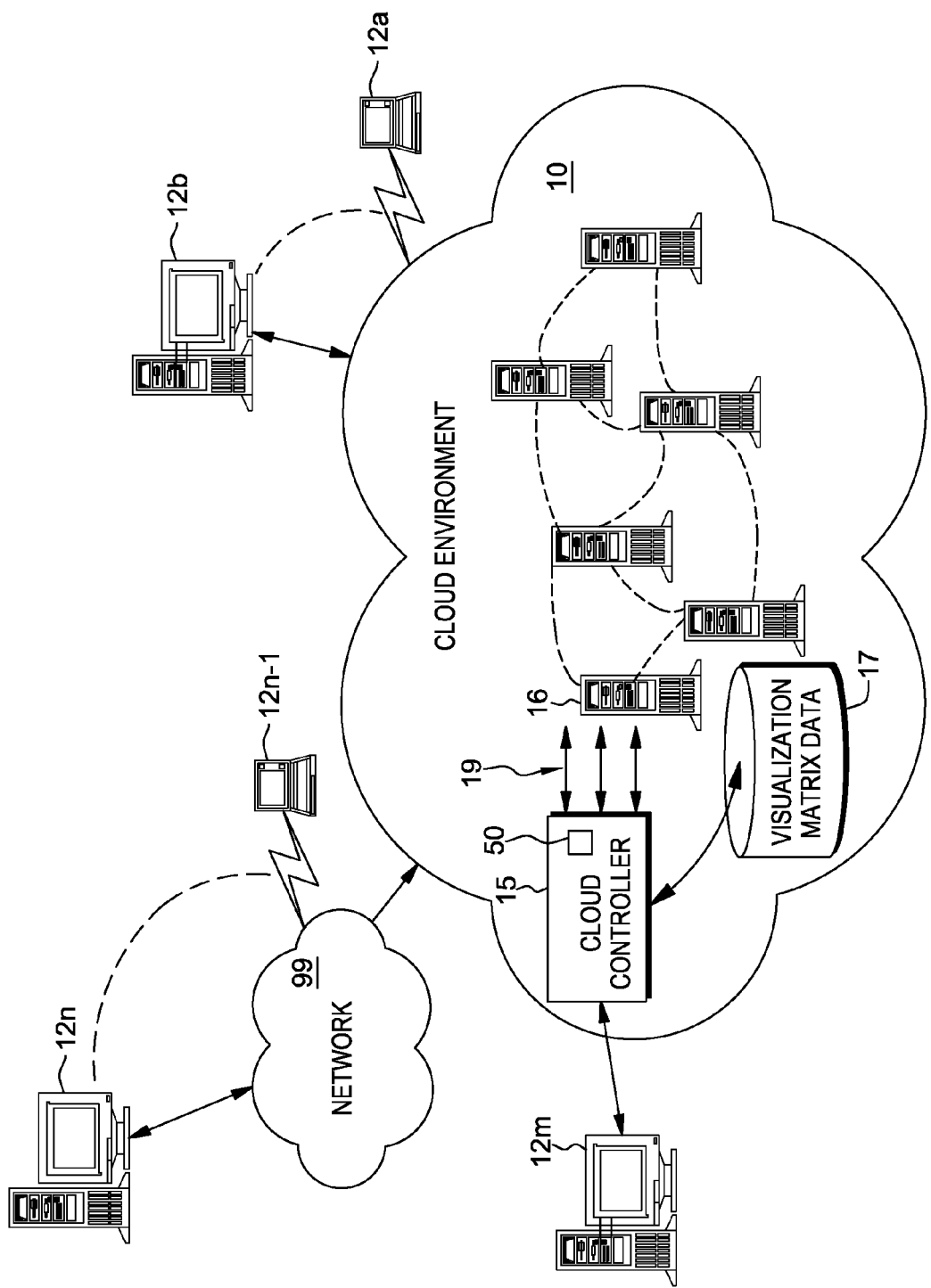
FIG. 1 illustrates an example cloud environment 10 in which the present system and method, embodied as a graphic user interface tool, is deployed, in one embodiment.

FIG. 1 depicts an example data center or cloud computing environment 10 in which the present system and method, embodied as a graphic user interface tool, enabling a user, e.g., a cloud administrator or like system administrator, for visually analyzing, clustering, transforming and consolidating the host machine images that are present in a cloud computing environment 10, is deployed. As referred to herein, an "image" includes: virtual-machine images; "real" images, or content from physical machines obtained when the machines are non-active, e.g., from a back-up image; "snapshots" of running machines (physical or virtual), e.g., a copy of the contents of a machine while it is running; and, live data from running machines (physical or virtual).

Typically, a cloud 10 comprises a cloud manager or controller device 15 (e.g., a computer such as a server), a group of servers 16, and one or more storage device(s) 17 hosting application data, support data and other data such as software inventory results data 19 acquired, such as by prior invoking the aforementioned Tivoli (TADDM), CTI or Mirage™ software discovery processes for visualization and analysis as conducted by the system described herein. Although not shown, the cloud 10 may comprise additional servers and/or additional storage devices. The cloud controller 15 typically receives a job(s) from client(s) 12a, 12b, . . . , 12n. For example, as shown in FIG. 1, example clients (computing/mobile devices) 12a, 12b submit processing tasks or jobs directly to the cloud controller device 15, while example client devices $12_{n-1}$, 12n submit processing tasks or jobs via a network environment 99, e.g., Internet or Intranet through a web services interface of the cloud 10.

Items, operations, and procedures involved in the cloud controller device 15 are described below.

Figure 2:
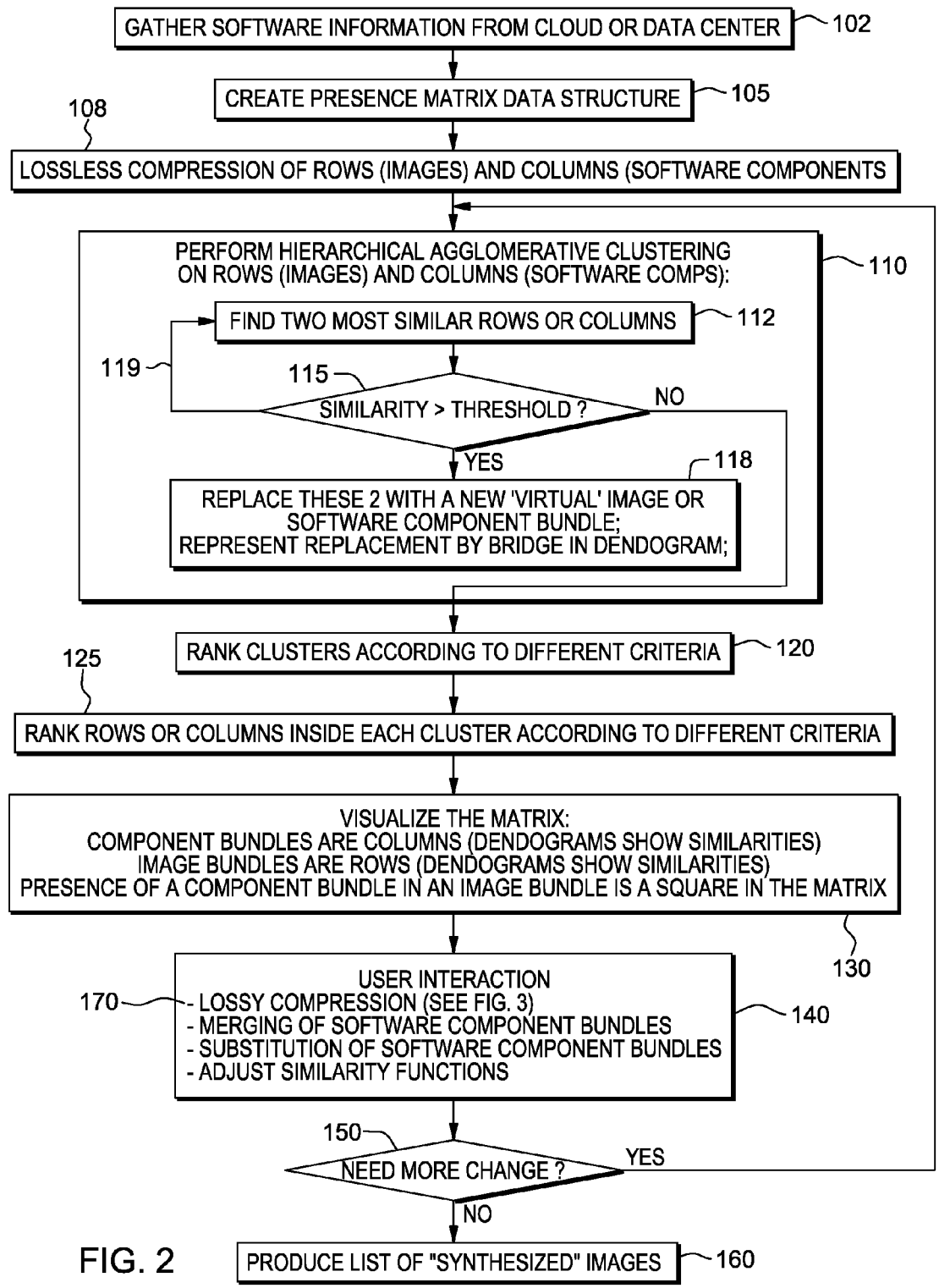
FIG. 2 a illustrates control flow or logic for visualizing data associated with a cloud environment in one embodiment.

FIG. 2 depicts a method 100 operated on cloud 10. First, as indicated at 102, the tool gathers the acquired software discovery results from the cloud or data center, e.g., using the aforementioned software discovery tools. The software inventory results are provided typically as a list of software components (e.g., OS, middleware (e.g., Webshpere or DB2), Red Hat® Package 1 or RPM entries (Red Hat a trademark of Red Hat, Inc. Corporation of North Carolina, USA), files, or other software components, etc.) discovered on a set of machines or virtual images in Cloud 10.

Then, at 105, FIG. 2, the tool creates a presence matrix data structure and not yet in a form to be visualized. The presence matrix data structure stores information that will be later processed by the tool and includes a matrix that maps the cloud's hosts/images, and individual software components available in each host machines/virtual image.

Figure 4:
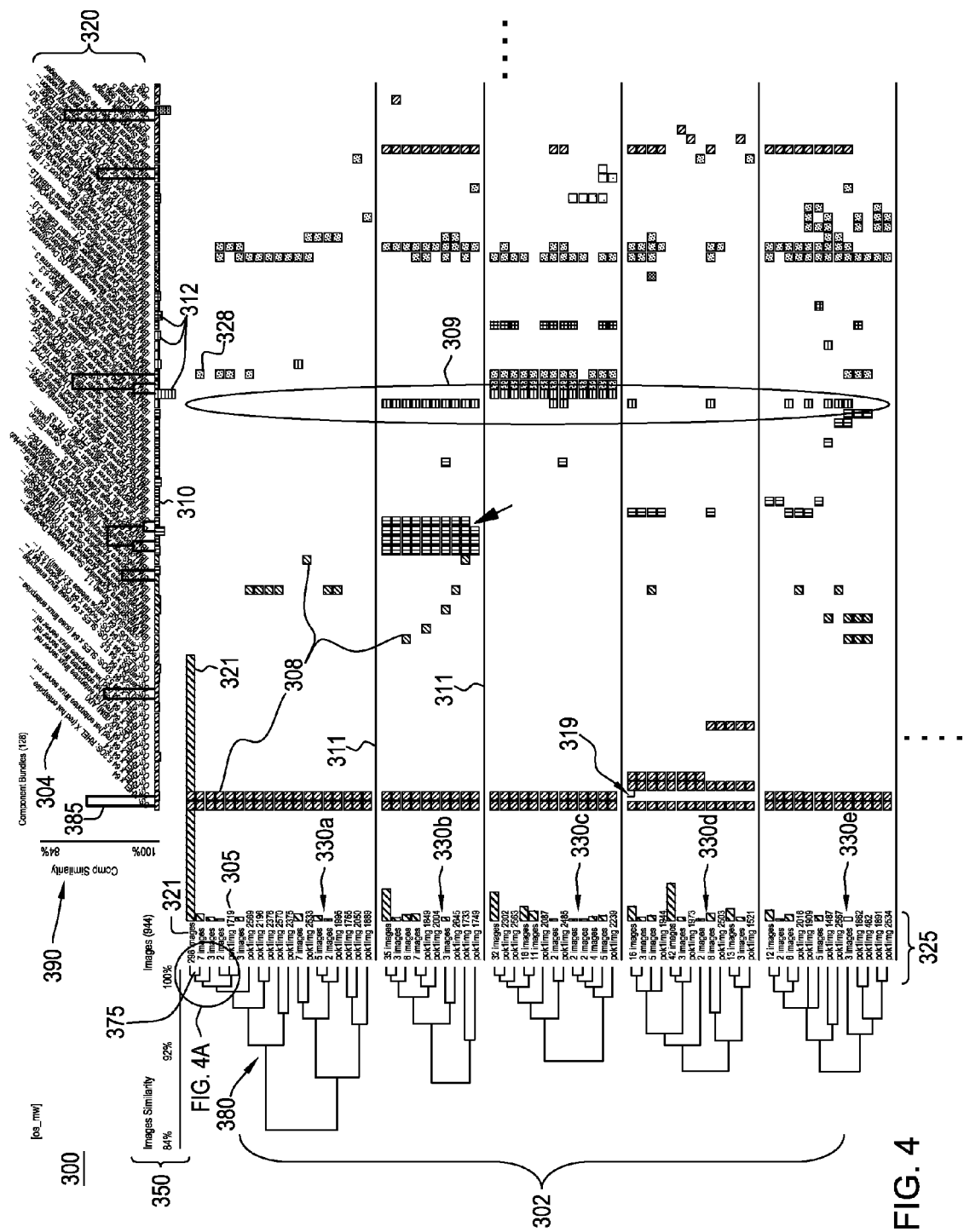
FIG. 4 depicts a resulting visualization 300 of the presence matrix data structure after performing a lossless compression of the images/components.

More particularly, as will be described in greater detail herein below, the tool performs a consolidation analysis (e.g., a compression and clustering analysis) of the data structure and presents the analysis in a form for display to the user as a visualization matrix 300 of the cloud repository in the manner as shown in FIG. 4. That is, FIG. 4 depicts a resulting visualization 300 of the presence matrix data structure after processing by the tool. This visualization 300 is generated for display in a manner such that users can interact with to perform analyzing and/or transforming and consolidating (or standardizing) of the host device images that are present in a cloud computing environment 10. As shown in FIG. 4, the displayed presence matrix visualization 300 includes Rows 302 indicating the cloud's hosts/images (e.g., Virtual images or machine IDs of physical machines) 305, and Columns 304 as indicating individual software component 310 which can be: files, RPM entries, software packages, O/S components, files, etc., or as will be explained, bundled software components 320. The intersection of a particular image, e.g., computing machine 305, and a particular software component 310, e.g., a software package, is indicated on the matrix by a block 308, describing that the particular image includes the particular software component. A presence vector 309 is indicated as a column in the matrix indicating in which images (if any) the software component is present or absent.

Thus the entries in the visualization matrix 300 indicate the presence of one or more components, as given by the x-coordinate, from the top row of software components, on a given host or virtual image, as given by the y-coordinate of the virtual image list on the left. If two or more virtual images contain the same set of software components, i.e., if two rows in the original presence matrix are identical, these will be visualized by a single row, instead of their respective rows. Similarly, if two columns in the original presence matrix are identical, these will be visualized as a single column, instead of their respective columns.

That is, returning to FIG. 2, at 108, the tool performs a lossless compression of the presence matrix data structure—a compression of rows (i.e., images) and columns (i.e., software components). This step includes the transforming the software components of the matrix columns into component bundles 320 with each component bundle 320 representing a set of components, for which all its constituent components are either present (appear together) or absent in any of the images. For example, a Java developer (having a JDK) may require several files that always appear together, e.g., a same group of installation files. Particularly, the tool compares each column in the matrix data structure to another column (including use of optimization techniques) to find exact matches and these are combined into a component bundle.

In view of FIG. 4, those software components 310 in columns 304, including but not limited to: O/S, middleware, RPM components, files, (or other software components are displayed on a horizontal axis) that always appear together across the set of machines or virtual images under study are grouped together. In one embodiment, the grouped software components, i.e. component bundles 320, may be represented by a geometric shape such as a rectangle 312 at the horizontal axis. In one embodiment, attributes of the rectangle can be modified to indicate detailed aspects of the grouped software bundle. For example, the taller a rectangle 312 in this line, the more components it contains, which always appear together in the discovered images. In one embodiment, the rectangle's color attribute can reflect the kind of software component. For example, a company's brand color may be used for the most prominent software component if applicable, black for OS components, gray for non-company or outside vended software, etc. . . . ).

This lossless compression step further includes transforming the matrix rows into image bundles 325 with each image bundle 325 representing a set of images (e.g., computing machines) that have exactly the same software components, taken into account during the discovery. Particularly, the tool compares each row in the matrix data structure to another row (including use of optimization techniques) to find exact matches, i.e., machines having the same exact software content—components or bundles 310) and these are combined into a single image bundle 325. An example of this can be seen for the top four entries of the virtual images 305 in the FIG. 4. The first row 321 represents a bundle having a set of 298 images found to have an identical set of software components or bundles, the second row represents 7 images, the third one 3, and the fourth one 2 images, etc. In one embodiment, the grouped images, i.e. image bundles 325, may be represented by a colored rectangle 321 at the vertical axis. When an image has a unique set of software components (i.e. when no other image has the same content), it will be represented as a bundle with just one image, labeled with the ID of the image, for example shown by 305.

It is understood that after collapsing the matrix in component bundles 320 and image bundles 325, no two columns or no two rows in the matrix will be the same.

The tool further sorts the rows (images) so that similar images (or image sets) are clustered into groups of images, e.g., demarcated by thin horizontal lines 311 across the matrix. For example, in FIG. 4, the first 19 rows are clustered into one group of images with a similar composition of software components.

Returning to step 110, FIG. 2, in one embodiment, the tool performs a hierarchical agglomerative clustering on the rows (images) and the columns (components) of the visualization matrix using an adjustable similarity function. That is, after lossless compression 108, at 112, the tool identifies most similar rows (or columns) and determines at 115 whether a similarity between the identified rows (or columns) exceeds a predetermined threshold. For example, two machines may have the same content but only differing in a minor respect, e.g., a machine having software component Websphere 5.4 versus a machine having a Websphere 5.5. These are very similar contents that could be clustered together, i.e., within a threshold. If the determined similarity between the identified rows (or columns) does exceed a predetermined threshold, then, at 118, a "bridge" in a dendogram is generated that "connects" the two related images (e.g., first two rows) with a vertical segment. The horizontal position of this vertical segment indicates a degree of similarity against a similarity scale 350 as described in greater detail with respect to FIG. 4A. More particularly, the vertical bridge part 375 represents the consolidation or combination of the respective images it connects. In one embodiment, the bridge may be color coded to indicate the most predominant software in the software components of the consolidated images. Likewise, leg components 376 of the dendogram 380 may be colored in the dendogram to indicate which software component is required to combine or consolidate the images (i.e. which components need to be added, removed or modified for the consolidation). Thus, as shown in FIG. 2, as this is a hierarchical agglomerative clustering, a recursive process, steps 112-118 are repeated as indicated by the return 119 such that each row (or column) of the matrix is traversed and compared to all remaining rows (or columns). That is, in the next iteration, a next two similar images are found based on similarity threshold and a synthesized image will be generated by the bridge 378 representation indicated. As described in greater detail herein below, this result will further minimize the number of elements that are different in the visualization matrix when the user decides to collapse rows connected in a dendogram.

In one embodiment, at 112, FIG. 2, the tool compares each matrix line against the other remaining line(s), and the two lines that are most similar are placed together in the visualization matrix representation. In the example matrix depicted in FIG. 4, it is determined that two compared rows are within a threshold determination. For example, in view of the visualization matrix of FIG. 4, the first two rows having a first bundle 321 of 298 images and a second bundle of 7 images, respectively, are nearly identical save for the presence of an additional component 328 in the second image bundle (and corresponding absence of that same particular software component in the first image bundle 321). Having determined that the compared two rows are within the threshold determination, the process proceeds to 118 where these two image bundles are "replaced" with a new 'virtual' image. For example, as indicated in FIG. 4 and in the detailed view of FIG. 4A, the replacement is represented by a bridge 375 in a dendogram 380.

This replacement represents a "synthesized image" that is the consolidation of the top two image bundles. Such a synthesized image provides all the functionality of its consolidated images. Since the consolidated images were similar to each other, one can expect that the resulting synthesized image will contain fewer software components than the sum of the software components found in each of the consolidated images. This is because some of the software components may occur duplicated, or may occur with slight differences (e.g. versions) across the consolidated images.

Thus, for example, within a cluster, e.g., cluster 330a, the tool shows image similarity with a dendogram 380 (the rectilinear connections between images). Such a dendogram reflects the results of a hierarchical clustering of the group of images. Highly similar images are connected by a bridge 375, such as a vertical line segment, that is closer to the 100% point 351 on the scale 350 at the top; less similar images (or groups of images) are connected by a bridge with a vertical line segment that is more to the left of the scale 350 indicating a lesser degree of similarity of the bridged images or components. Thus there is provided a synthesized image and the two images are collapsed and a synthesized image generated indicating a degree of similarity.

Figure 4A:
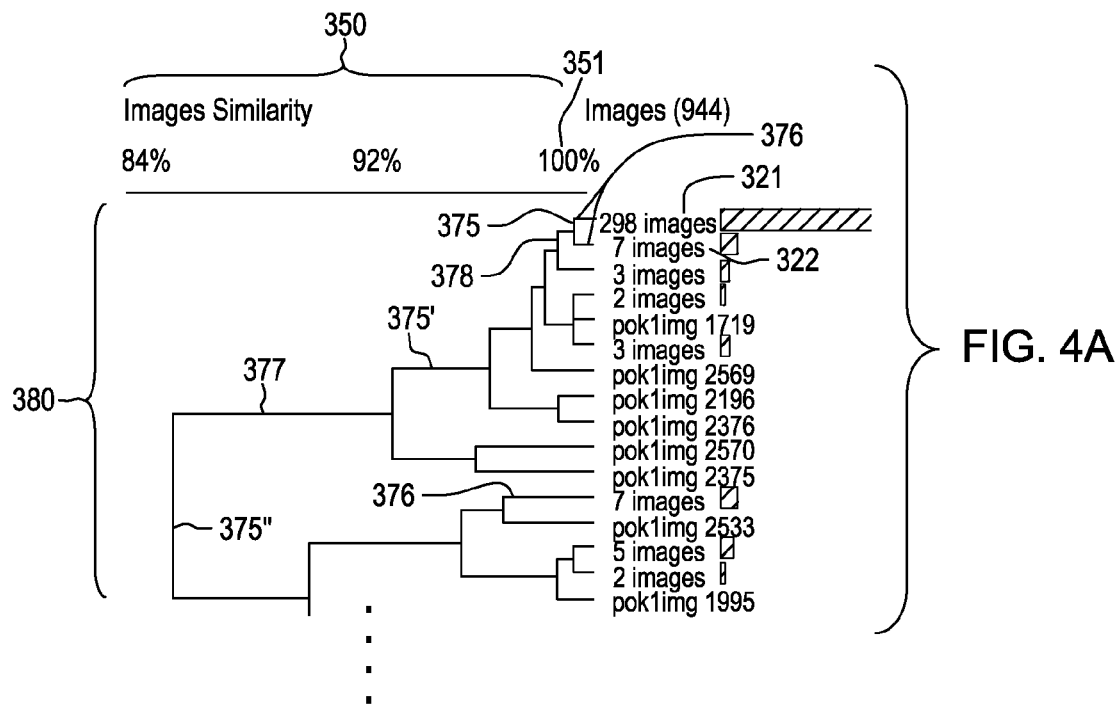
FIG. 4A shows similar (not identical) image bundles indicated by a bridge 375 in a formed dendogram 380 of FIG. 4 in one embodiment.

FIG. 4A in greater detail that portion of the dendogram 380 shown in FIG. 4 for the first cluster 330a. The dendogram 380 shows a replacement of similar (not identical) image bundles by a bridge component 375 of the dendogram 380 connecting legs 376 indicating the respective two bundled images with each bridge 375 positioned against the scale 350 presented above the dendogram to that indicate the degree of similarity between the bridged images. For example, for the example visualization matrix of FIG. 4A, the first two rows have a first grouped bundle of 298 images indicated by rectangle 321 and a second grouped bundle of 7 images indicated by rectangle 322, respectively, that are nearly identical (e.g., ~99%) and in FIG. 4A the bridge 375 will be positioned close to 100% label in scale 350. It is noted that the bridged images of the dendogram 380 are color coded such that the horizontal lines legs 376 may indicate which components of the color coded visualization interface 300 would have to be added (or removed, or modified) if their root images were to be consolidated. For example, in the example dendogram 380 shown in FIG. 4A, a bridge 375 appears color coded to indicate the predominant similar software components in those connected images, while bridge 375' of dendogram 380 may be color coded differently to indicate the further prominent software component, e.g., IBM Webshpere, for its respective attached images. As further shown in the example dendogram portion shown in FIG. 4A, to consolidate images from one level of the hierarchy indicated at bridge 375' to the next higher level indicated as images connected by bridge 375", the horizontal leg 377 connecting the two levels is color coded to indicate the particular software component that would be needed to consolidate the images.

Figure 4B:
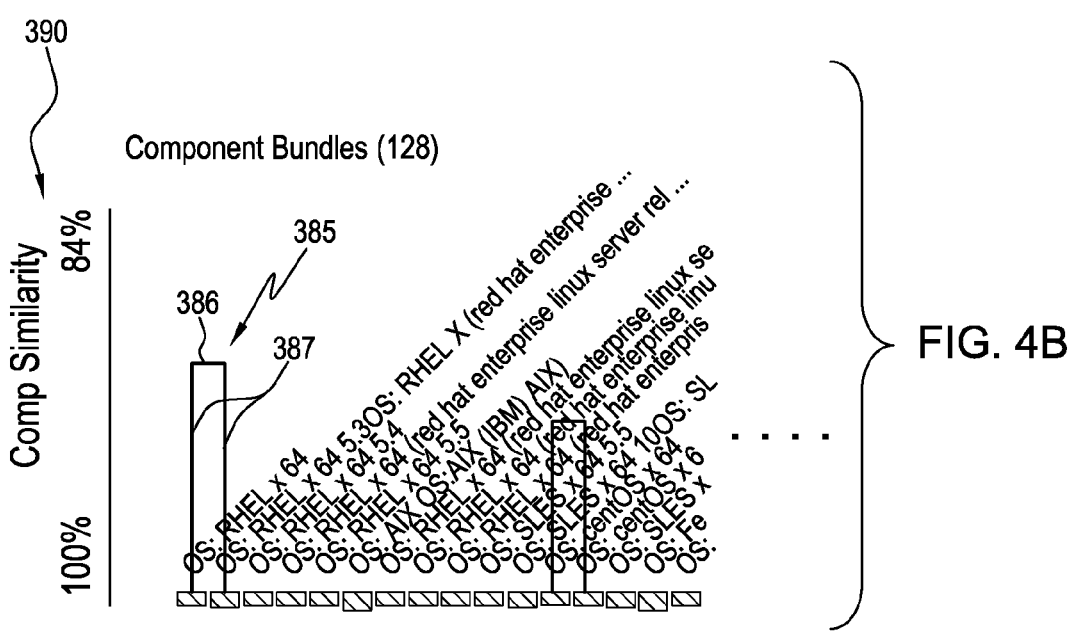
FIG. 4B shows similar (not identical) component bundles by a bridge of dendogram 385 in one embodiment.

As mentioned, dendograms are generated similarly for software components in the visualization matrix 400. FIG. 4B shows in greater detail that portion of the dendogram 385 shown in FIG. 4 where the first two columns are highly similar. This means that the presence of the first component bundle across all images, as indicated by the first column in the matrix in FIG. 4, is very similar (i.e. meets the similarity threshold) to the presence of the second adjacent component bundle. Consequently a bridge of a dendogram is generated that is positioned against a scale 390. The horizontal segment of this bridge indicates the degree of similarity between the bridged (similar) component bundles. In the example of FIG. 4B, the similarity scale 390 indicates about a 90% similarity between the first two bridged component bundles of the example depicted. As can be seen in FIG. 4, almost all of the images of four of the five clusters 330a, 330b, 330c, 330e have the software components indicated by the dendogram 385; however, the cluster 330d shows images wherein one of the software components is missing as indicated at 319, making the first two columns still similar but not identical Bottom-up clustering stops for similarities lower than a given threshold. The result are a number of clusters in each dimension including image bundles 325 having same or very similar contents component bundles with minor differences, e.g., version differences. Image clusters are shown in the example visualized presence matrix 300 of FIG. 4 indicated as image groups (clusters) 330a, 330b, . . . , 330e. As will be described, each formed cluster 330a, 330b, . . . , 330e will have an associated "golden master" image of components that can be used to replace or consolidated images in the visualization matrix having components as shown in the dendogram at each respective cluster.

With respect to the similarity threshold determination at FIG. 2, step 115, the similarity function can be the Jaccard index (http://en.wikipedia.org/wiki/Jaccard_index. Other similarity functions that can be applied may include, but are not limited to, the Cosine similarity (http://en.wikipedia.org/wiki/Cosine_similarity), or the Hamming distance (http://en.wikipedia.org/wiki/Hamming_distance). The similarity function can further take into account heuristics for software compatibility. Thus, for example, minor versions are easy to merge, thus yielding a high similarity; some software components are incompatible (i.e. cannot be placed together on the same image), yielding very low similarity.

Returning to FIG. 2, step 115, if no remaining two rows or columns can be found anymore that have a similarity higher than the predetermined threshold, the process proceeds to step 120 where clusters may be ranked according to different criteria.

In one embodiment, ranking of clusters at 125, FIG. 2 may include sorting the clusters in each direction according to a predefined weight function. For example, in the vertical dimension, the image clusters that have the highest number of images could be ranked higher and placed (more visibly) higher up to present the most important clusters (in terms of images that can be consolidated) to the user, e.g. the cloud administrator, most visibly, at the top. Alternatively, the clusters with the highest similarity could be ranked higher. Such a ranking would present the image bundle clusters that are "lowest hanging fruit" (easiest to consolidate, since most similar) at the top. Further, for example, in the horizontal dimension, the component clusters with a presence in the highest number of images could be ranked higher and placed (more visibly) towards the left of the interface 300. In a further example, in each dimension, the ranking could also take into account the frequency of the software as it is deployed. In one embodiment, the same sorting could be applied to the elements within a cluster (in each dimension). Other embodiments can be implemented to reflect the priority that is considered important to the administrator.

Proceeding to FIG. 2, step 125, the tool may further rank rows or columns inside each cluster according to different criteria. In one embodiment, the same criteria may be applied for the intra-cluster ranking as for the inter-cluster ranking, e.g., placing more important rows at the top or more important columns to the left of the interface 300. Both for intra-cluster and inter-cluster ranking, other criteria may be applied. In addition to the ones already mentioned, popularity of images, frequency of use in the cloud, or user-defined criteria can be applied.

Finally, once the clustering and ranking processes are performed, the method proceeds to FIG. 2, step 130, where the tool performs steps to generate the visualization matrix such as the example visualization matrix 300 shown in FIG. 4, including a visualization of dendograms in each dimension. The visualization of the matrix data structure comprises computing the dendograms that show similarities between images in a cluster on a first axis (e.g., rows) of the example shown in FIG. 4A, and computing dendograms that show similarities between software components on a second axis (e.g. columns) of the example shown in FIG. 4B. As shown in FIG. 4, the visualization matrix 300 is generated to represent: each of the synthesized component bundles 320, e.g., along matrix columns; each of the synthesized Image bundles 325, e.g., along matrix rows, with the presence of a software component or software component bundle j in an image bundle i being represented by a cell (i,j) 308 in the visualized matrix 300. In one embodiment, the color or shape (e.g., a square), or other property/attribute of the cell (i,j), in the matrix could represent the "software category or brand family".

In FIG. 4A showing the example visualization of the dendograms. In the visualization of the dendograms, the bridges of the dendograms for the images can represent "synthesized images". These are imaginary images that combine the functionality of the constituent images as shown in the legs 376 of the dendogram bridge 375, which can be synthesized elements (images) or real images. The degree of similarity is indicated by the alignment of the bridge 375 against the scale 350. In a hierarchical clustering technique, the most similar images may be found first and these may be combined by the bridge to form a synthesized image (e.g., a union of the legs). The next most similar images may be found next, and the recursive process repeats for all images and software components. Thus, the graphical structure of the dendogram bridges show the most similar bridges aligned with the 100% on the scale 350.

The visualization matrix operates in conjunction with a visualization tool for user interaction with the matrix. For example, tooltips and colors on the dendogram parts may show to the user: the components of the combined images; what needs to be added to transition to a synthesized image; and dendogram bridges for the components (columns) indicate closely related component bundles.

Thus, in view of FIG. 2, once the visualization matrix is generated at 130, the user may directly interact with the visualized matrix in a more meaningful way as indicated at 140. In addition to revealing more information with tooltips or colors on demand (e.g., by hovering with a mouse over a part of the visualization), the user may interact in other ways.

For example, user interaction may include performing one or more of: a lossy compression (see method depicted in FIG. 3) described in greater detail below; a merging of software component bundles; a substitution of software component bundles; and/or adjusting similarity functions. Besides these interactions, other ones are possible.

Figure 3:
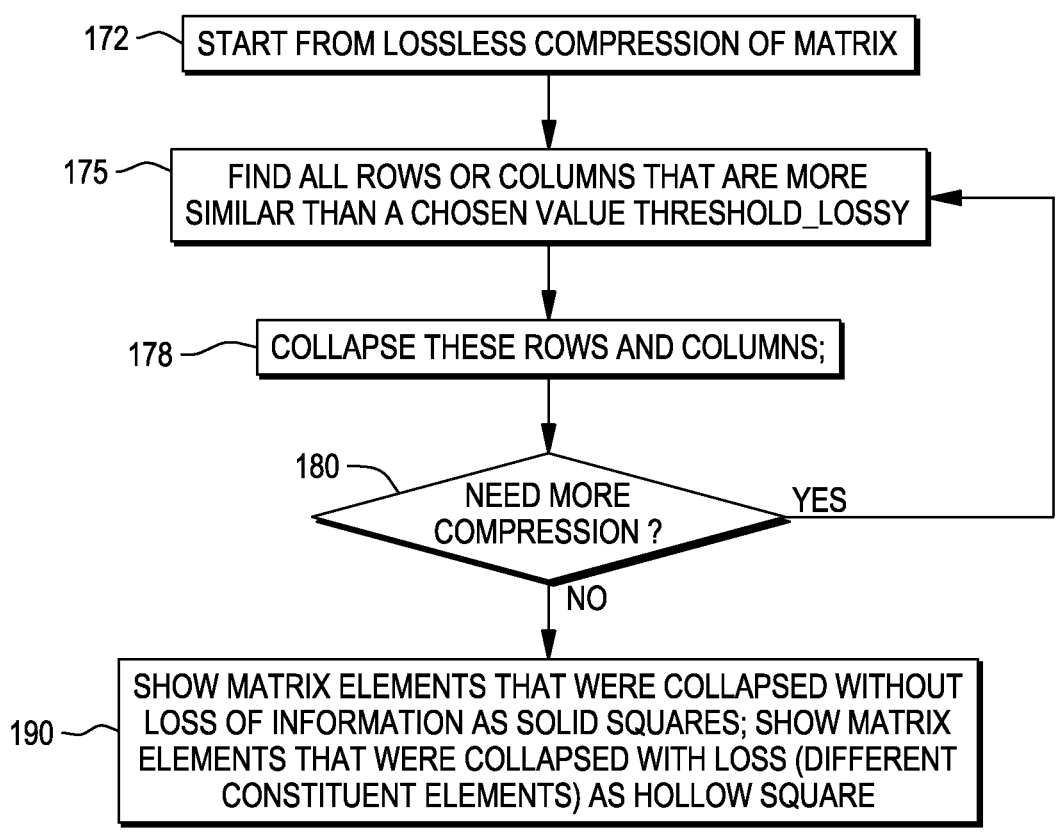
FIG. 3 depicts the process flow for further consolidating the visualization matrix 300 of FIG. 4 by compressing, on user demand, rows or columns in response to user interaction and manipulation.

FIG. 3 depicts the process flow for further consolidating the visualization matrix 300 of FIG. 4. The visualized matrix may be further compressed, on user demand, by collapsing similar rows or columns in response to user interaction and manipulation. This is represented as performing a "lossy" compression as performed at 170, FIG. 2. As shown in FIG. 3, at 172, there is provided/displayed the lossless compression version of visualization matrix 300. Then, at 175, functionality is invoked to determine all rows (or columns) that are more similar than a chosen threshold value "THRESHOLD_LOSSY". This value THRESHOLD_LOSSY in 175 may or may not be the same as the value THRESHOLD in 115 (FIG. 2). Typically, similar rows (or columns) will belong to the same virtual image cluster (or software component cluster, respectively). As shown in FIG. 3, the method then performs at 178, collapsing the determined rows (or columns). Then, at 180, a determination is made as to whether there is a need for further compression as determined by the needs of the user if the number of rows or columns is still deemed to high to easily provide insight as to where to consolidate image bundles or software components. If there is a need for further compression, the process proceeds back to 175 to change the chosen THRESHOLD_LOSSY value and invoke functionality to determine all rows (or columns) that are more similar than the new chosen threshold value. These process steps are repeated. If at 180, it is determined that there is no need for further compression, the process proceeds to step 190 where a visualization of the matrix elements that were collapsed are rendered.

Further, in view of FIG. 2, once the visualization matrix is generated at 130, and the user has attempted to or has directly interacted with the visualized matrix as indicated at 140, FIG. 2, the process proceeds to 150 where a determination is made as to whether there are any further changes that need to be made to the visualized data matrix.

Regardless of when or if a user performs a lossy compression, a user may also choose to collapse two (or more) specific image bundles (rows), or similarly, two or more software component bundles (columns). No similarity threshold is needed for this operation, since it is driven by the choice of the user.

If there are further changes desired, the process proceeds back to 110 to again perform hierarchical agglomerative clustering on rows (images) and columns (software components) and the process repeats produce a further visual representation for user interaction. If at 150, it is determined that there are no further changes that need to be made to the visualized data matrix, the process continues to produce a list of "synthesized" images at 160 which a user may use to facilitate evaluation of the cloud resources and perform further consolidation and/or management of cloud resources. Each synthesized image describes a software configuration that covers a cluster, an engineer uses this configuration, and optionally together with image construction tools, to produce a "golden master" image. In one embodiment, constructing a golden master is performed by presenting a consolidated list of packages and configurations to a package installer; which may require a human to resolve conflicts. Alternate embodiments, may be to generate a consolidated list of software components, collect installation CDs for the items on the list, and then install and configure from the CDs while addressing any conflicts.

Whether during performing a lossy compression, or at any time, a user may first be informed of candidates for synthesizing or combining images by hovering a mouse device pointer/cursor over a displayed element of the visualization interface, e.g., a horizontal line of a row, a vertical line, cell, or image or software component label, etc. In response to hovering, the system responsively displays more detailed information about content of that pointed to element. For example, to combine (consolidate) an image, it can be determined what needs to be added or changed in order to form the synthesized image or software component.

For example, as shown in FIGS. 6A-6H, the user can hover a pointer over the following displayed elements in the visualization to get further actionable detailed information including, but not limited to: the label of an image bundle; the bar 321 (if present, to the right of the image bundle labels); the label of a component bundle; the colored rectangles below the component bundle label; the cells of the matrix; and, the vertical lines and horizontal lines of the dendograms for the image bundles 325 and software components bundles 320.

Figure 6A:
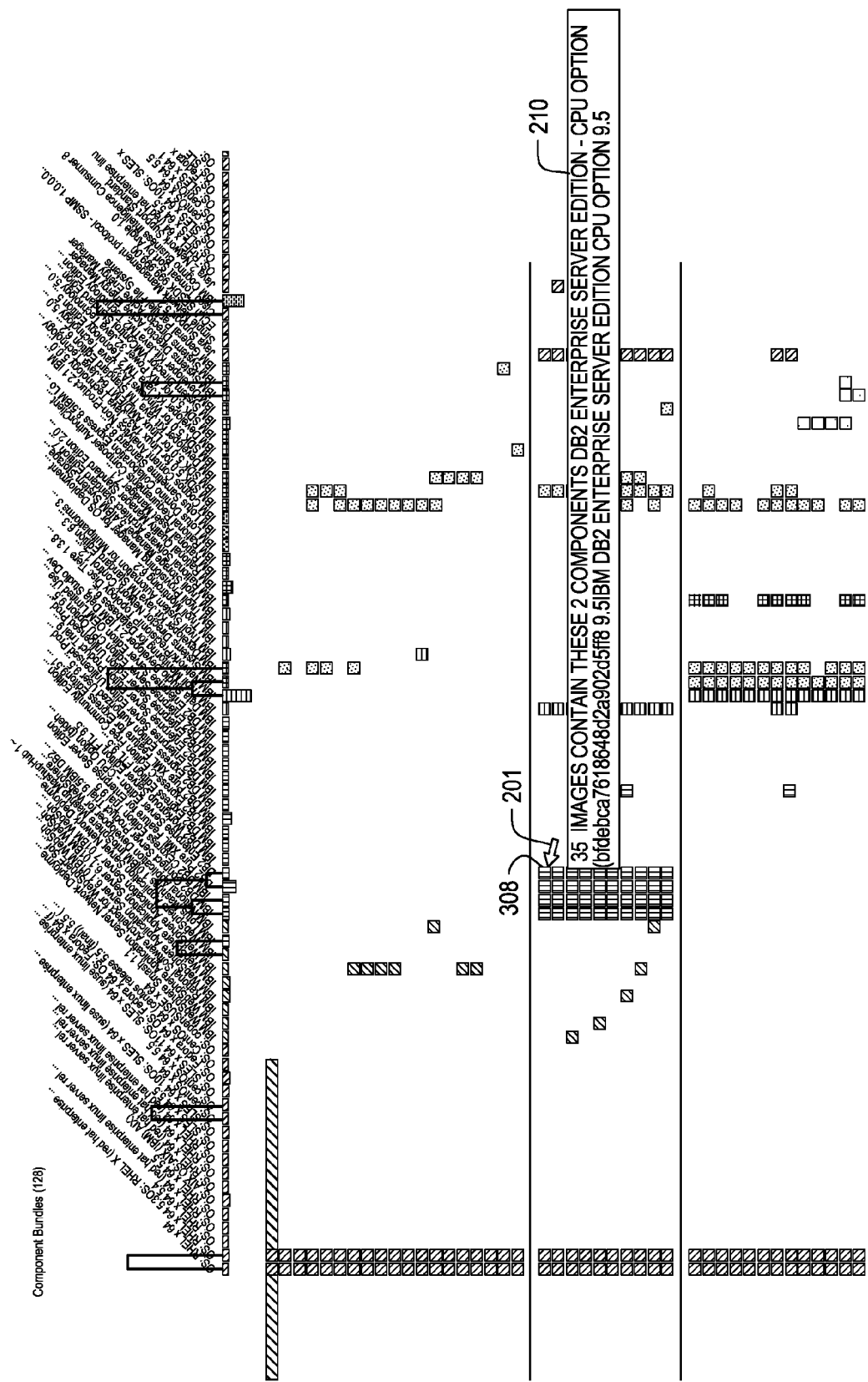
FIGS. 6A-6H illustrate various user interactions with the visualization interface to initiate display of further actionable detailed information from displayed elements in the visualization.
Figure 6B:
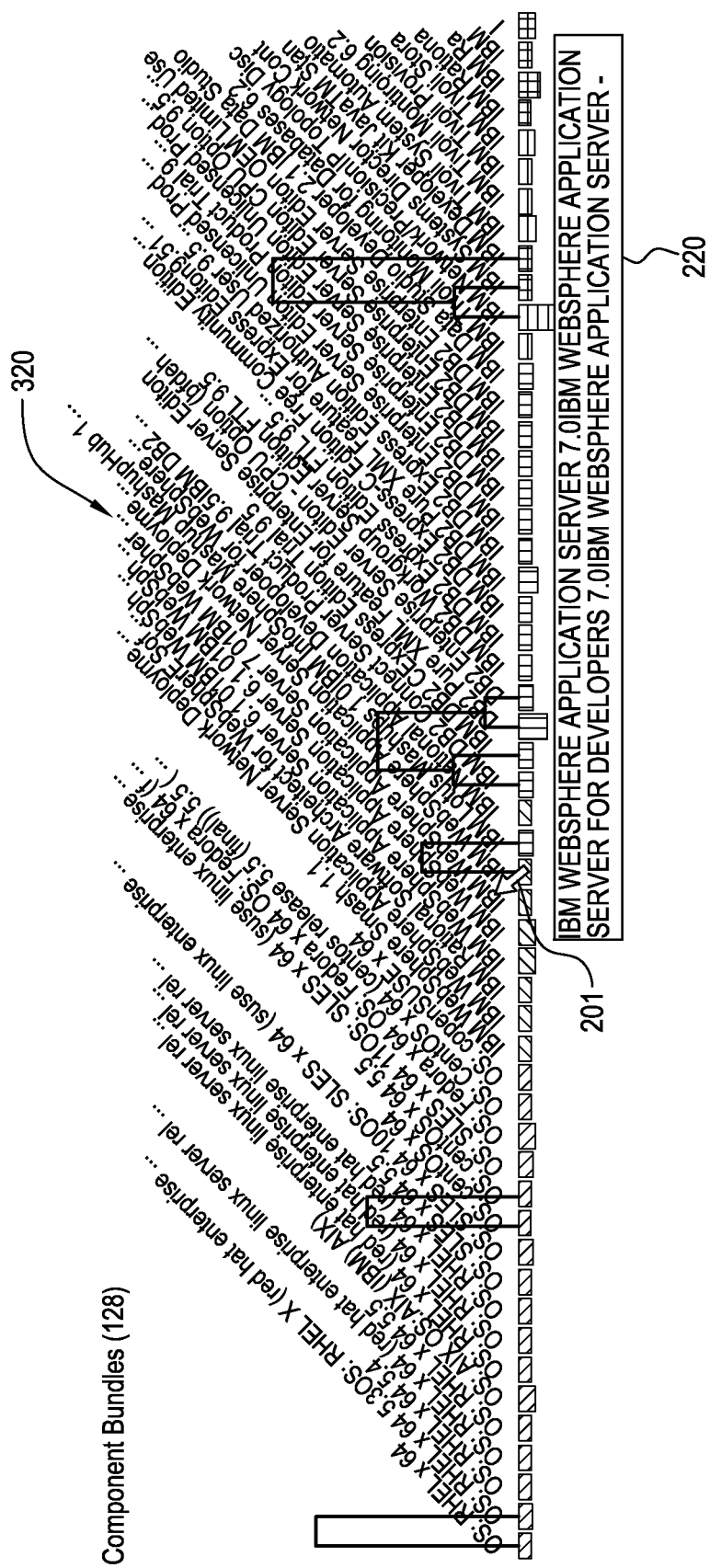

For example, in view of FIG. 6A, by hovering a cursor or pointer 201 over an intersecting cell 308 of the visualization matrix display of FIG. 4, e.g., the system generates a tooltip display 210 indicating details such as the software components and the image ID(s) that they occur in. In the case of a lossy compression, the tooltip may also inform which components are unexpectedly absent or present for the image bundle As a further example, in view of FIG. 6B, by hovering a display cursor or pointer 201 over the label of an software component bundle 320 on the visualization matrix display of FIG. 4, the system generates a tooltip display 220 indicating details such as the constituent software components of the bundle. It can also display properties of the component bundle. It can also indicate the size of the software components, as well as in how many images this component bundle is present. In the case of a lossy compression, the tooltip will also mention which components are absent (or present) in just a few images, unlike the majority, which is useful to find abnormal removals of software components from certain images.

Figure 6C:
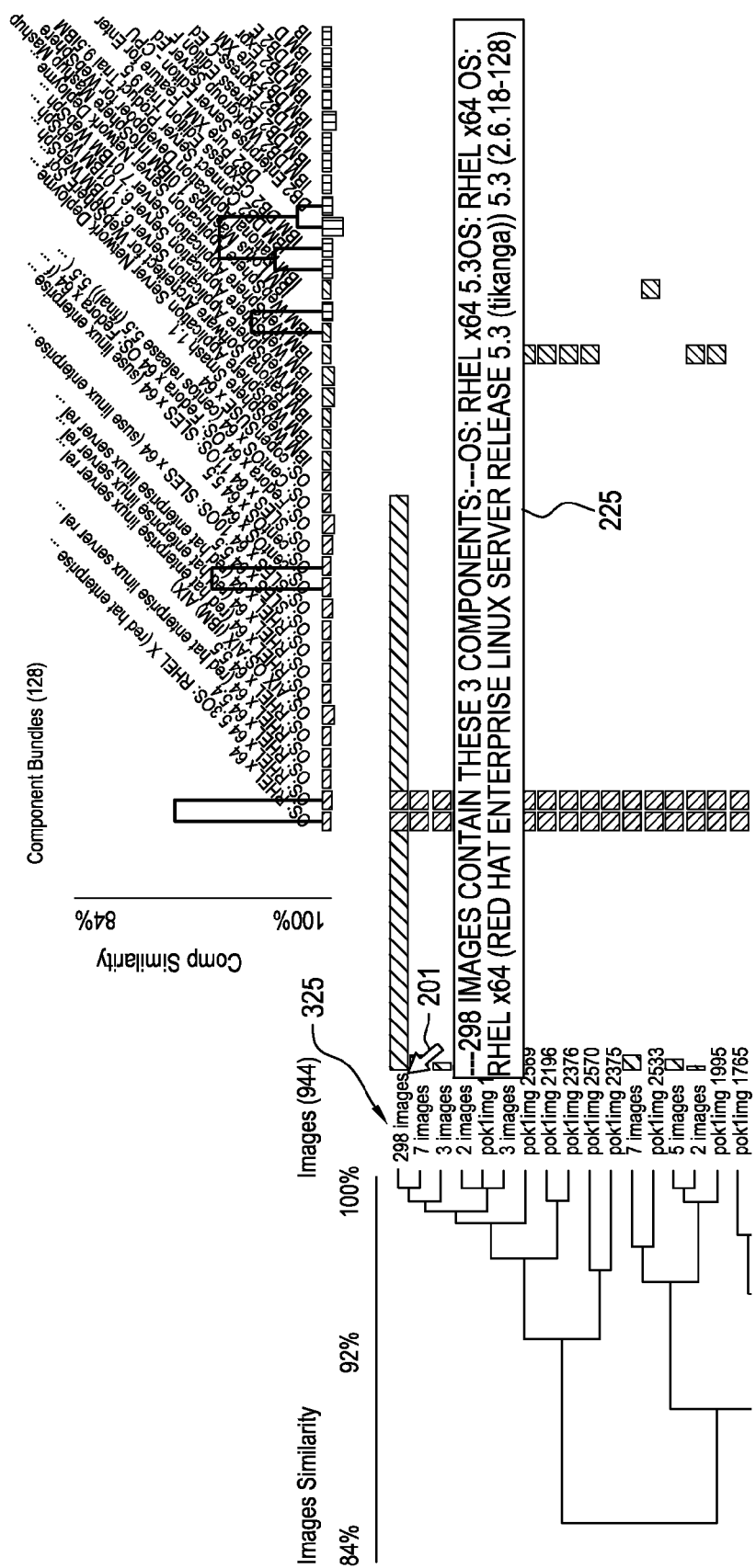
Figure 6D:
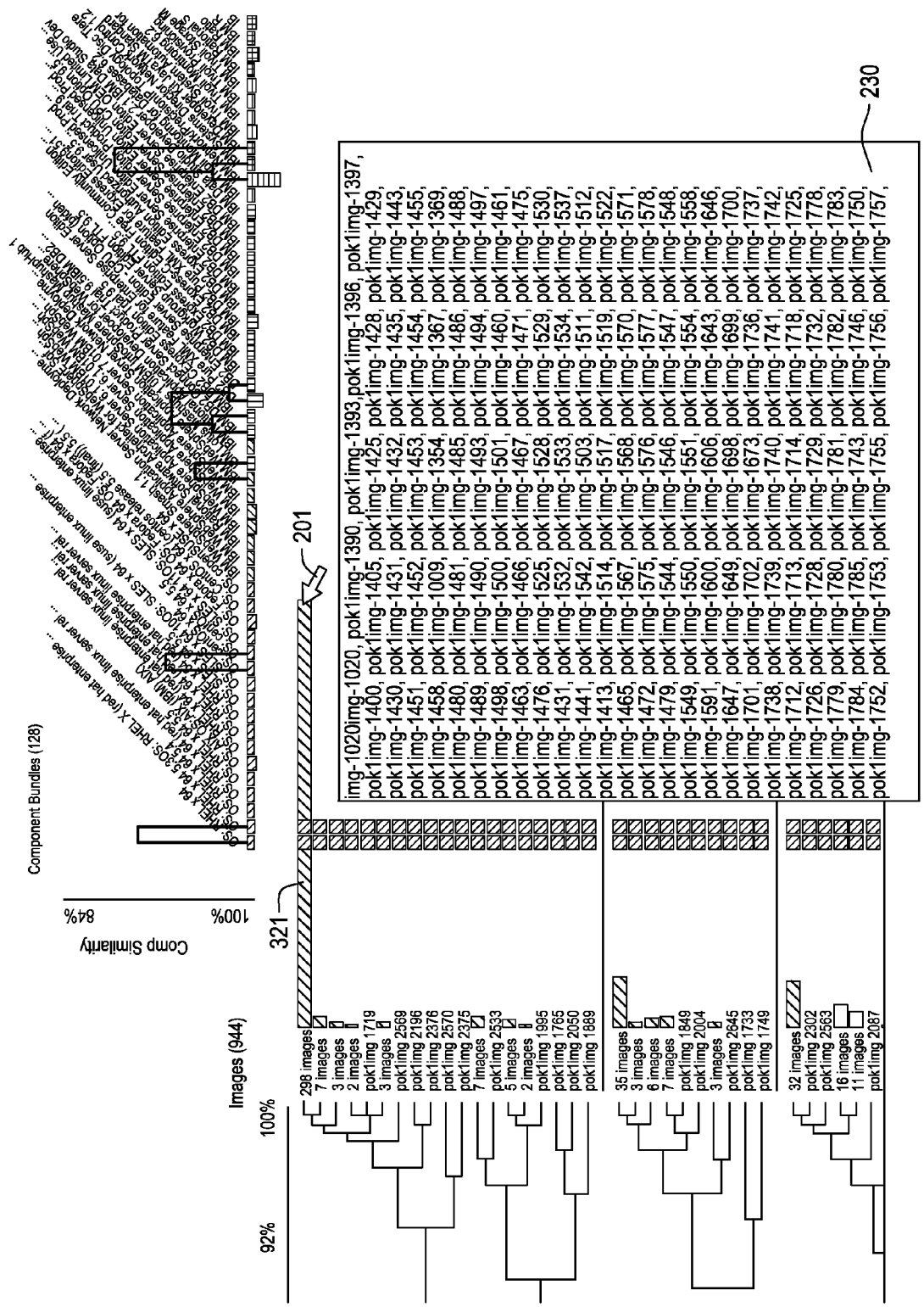

As a further example, in view of FIG. 6C, by hovering a display cursor or pointer 201 over the label of an image bundle 325 on the visualization interface display of FIG. 4, the system generates a tooltip display 225 indicating details such as the number of grouped images in the pointed to bundle and all the components in this image bundle. It also indicates how often this component bundle occurs across all images As a further example, in view of FIG. 6D, by hovering a display cursor or pointer 201 over the corresponding image bundle rectangle 321 indicating grouped images of an image bundle 325 on the visualization interface display of FIG. 4, as there is more than one image in the image bundle, the system generates a tooltip display 230 indicating details of the constituent image (identifiers or IDs) of the bundle. It also displays the software components that are contained in the image bundle. It can also display properties of the image bundle like size, number of times this image was deployed, popularity, etc.

Figure 6E:
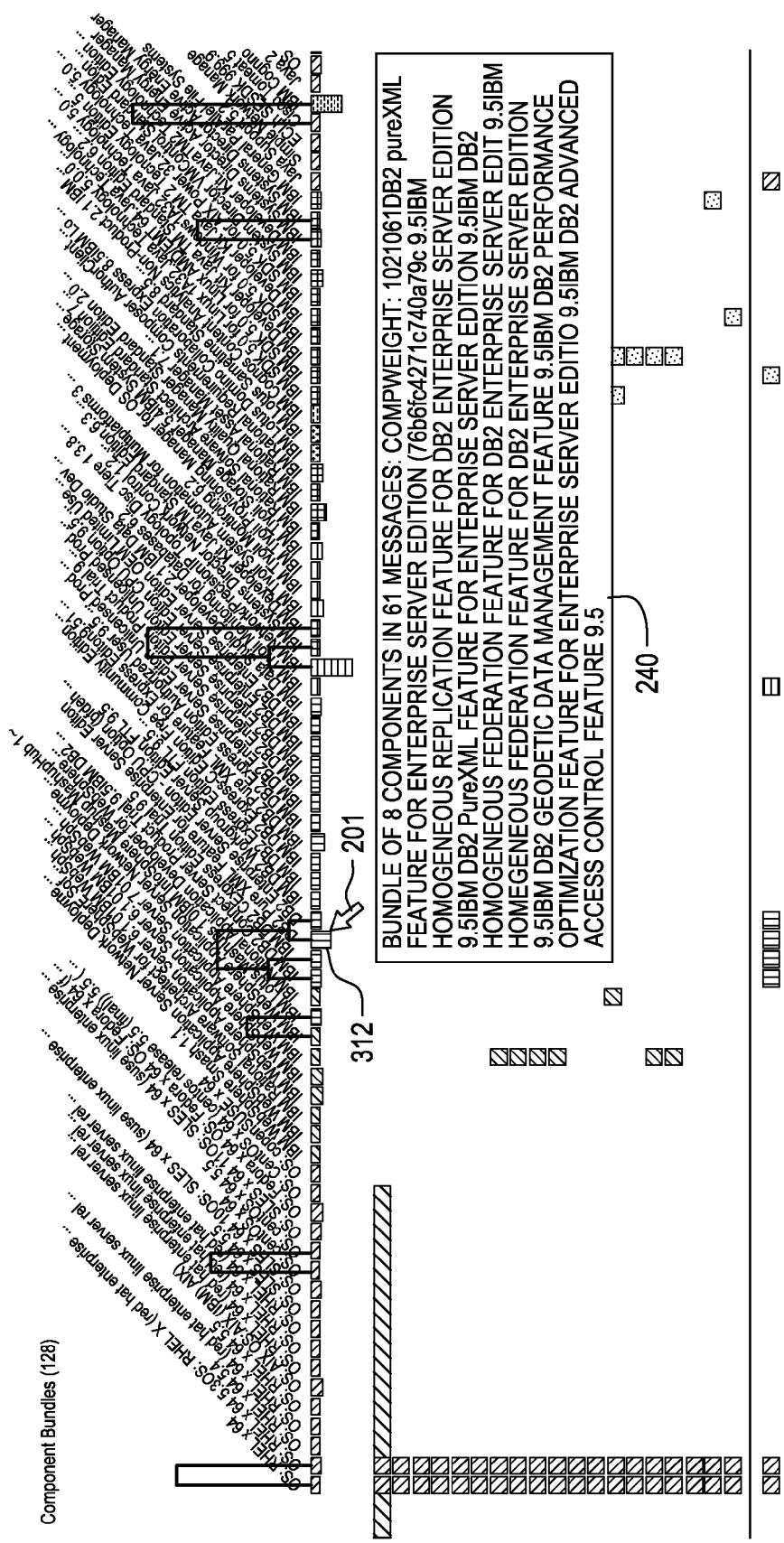

In a further example, in view of FIG. 6E, by hovering a cursor or pointer 201 over the displayed geometric shape 312 indicating grouping of software components into a component bundle at the horizontal axis of the visualization interface display of FIG. 4, the system generates a tooltip display 240 indicating details such as the number of grouped software components in this bundle including details of the bundled software in addition to the constituent number of images in the pointed to bundle.

Figure 6F:
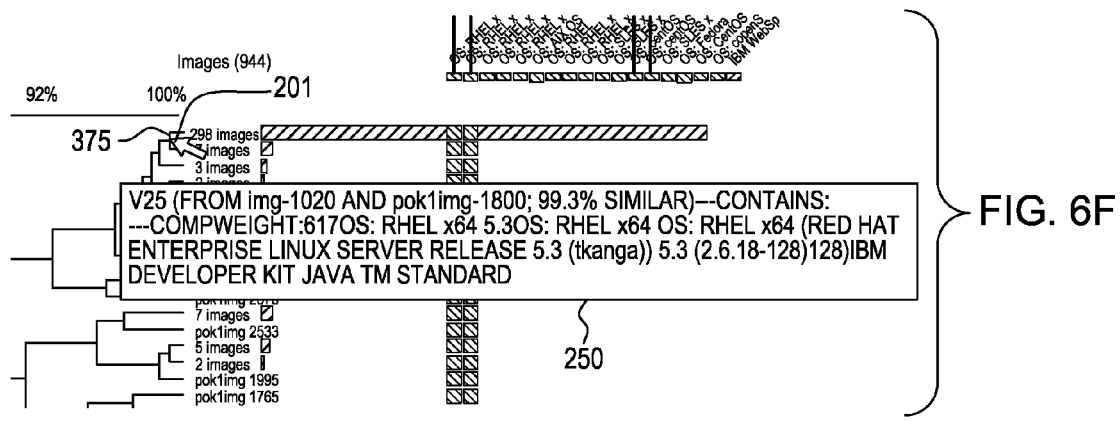

As a further example, in view of FIG. 6F, by hovering a displayed cursor or pointer 201 over a vertical segment 375 of the dendogram bridge displayed on the visualization matrix display of FIG. 4 connecting two image bundles, the system generates a displayed tooltip 250 that describes the degree of similarity between the two (possibly synthesized) constituent images that this vertical line connects (e.g., 99.3% similar for the example depicted). In other words, it shows the exact percentage of similarity in a textual form that was already given graphically by the horizontal position of this vertical line with respect to the Image Similarity scale. The displayed tooltip 250 also reveals the list of software components that this synthesized image contains as a result of the consolidation. It can be accompanied by their respective sizes and the total cumulative size. This detailed content of a hypothetical synthesized image including the software component(s) may be a good substitute for the components found on the constituent images below the dendogram.

Figure 6G:
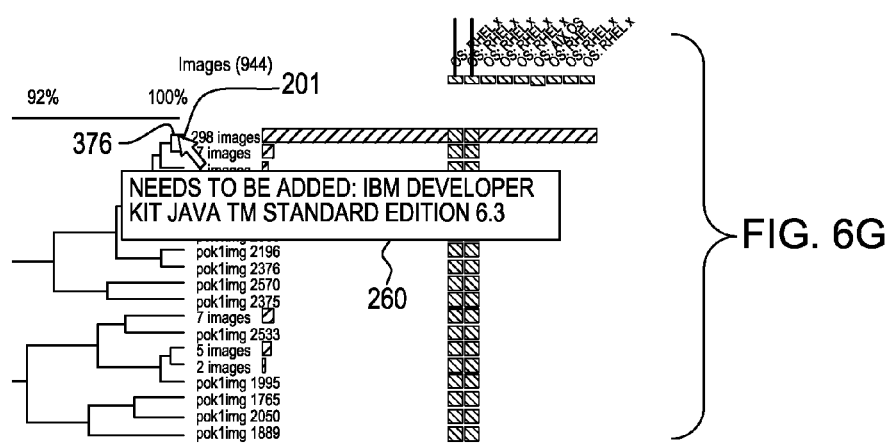

In a further embodiment, in view of FIG. 6G, by hovering a displayed cursor or pointer 201 over a horizontal segment 376 of the dendogram bridge displayed of the visualization matrix display of FIG. 4, the system generates a displayed tooltip 260 that includes details revealing the difference between an image (on the right of a horizontal line) and the synthesized image that it should be transformed in. Thus display 260 includes details such as a list of software components that need to be added (or subtracted, or changed) in order to transform an image to its "target" synthesized image.

Figure 6H:
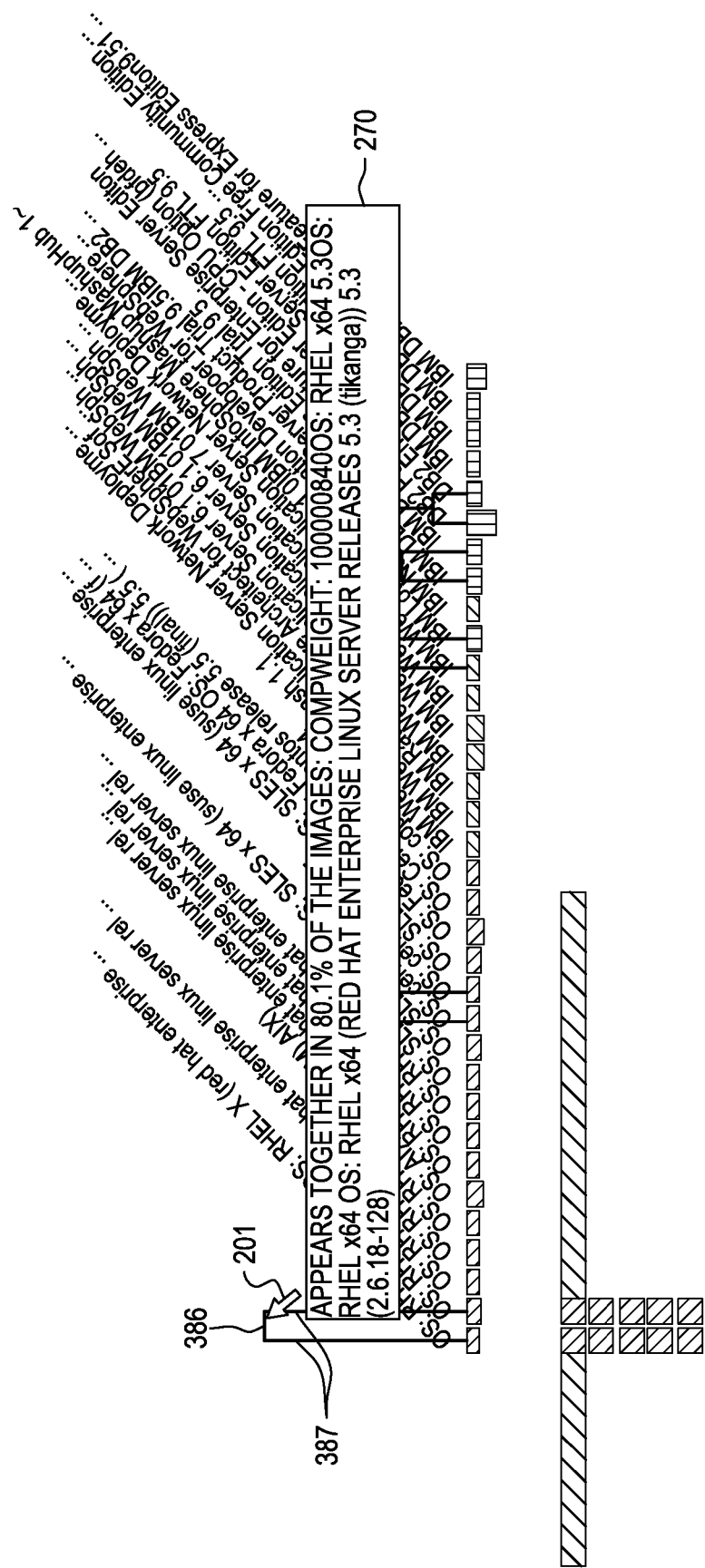

Likewise, in view of FIG. 6H, by hovering a displayed cursor or pointer 201 over a horizontal segment 386 of the dendogram for the software component bundles 320 of the visualization matrix display of FIG. 4, the system generates a displayed tooltip 270 that includes details revealing the similarity between the component bundle on the left and on the right vertical lines 387 connecting horizontal segment 386. The display 270 also indicates the cumulative list of software components found in the component bundles indicated by lines 387.

Figure 5:
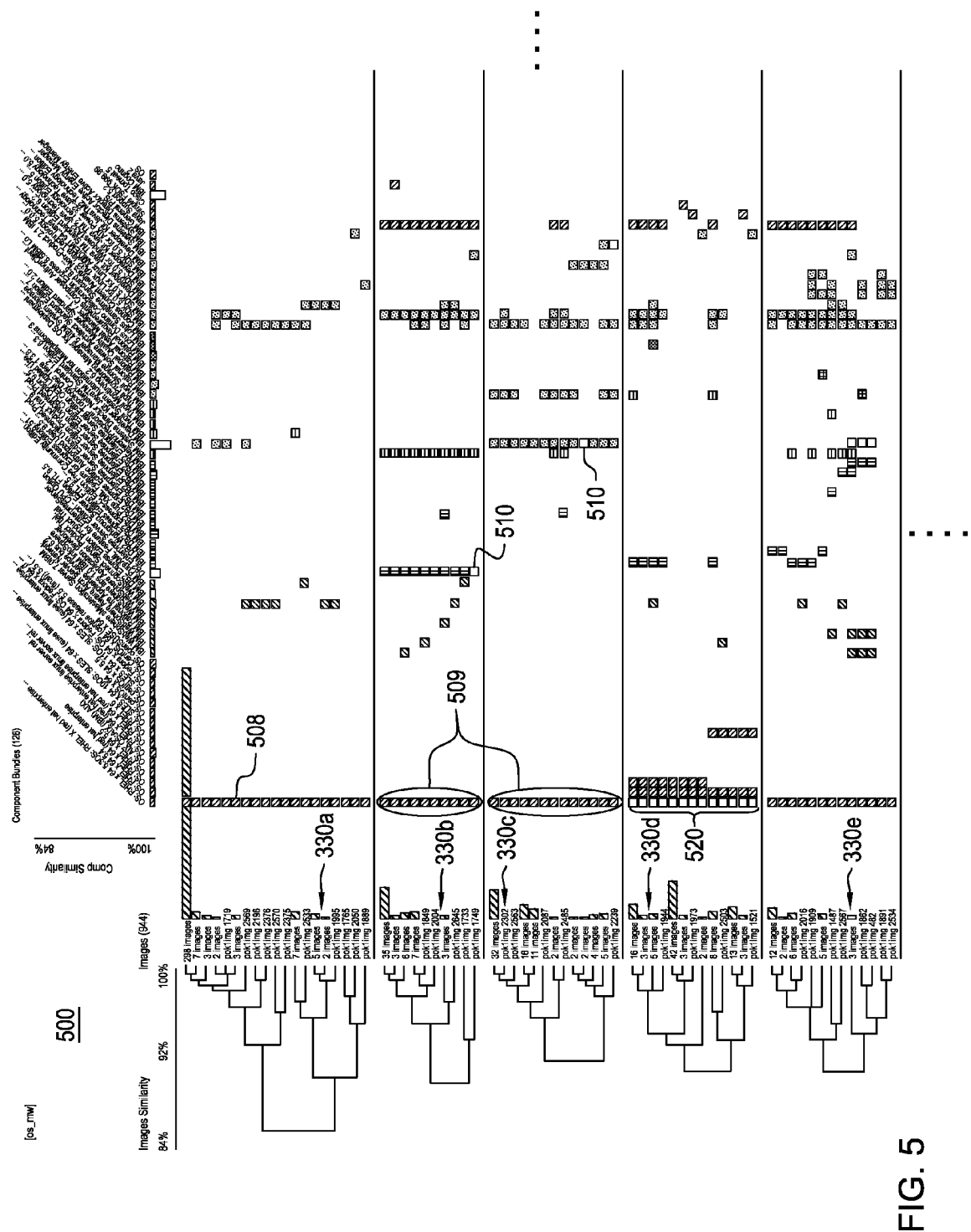
FIG. 5 depicts a resulting compressed visualization interface 500 of the visualization matrix data (of FIG. 4) after processing by the tool and performing a lossy compression of the images/components.

FIG. 5 depicts the resulting visualization matrix 500 after performing lossy compression of the visualized interface 300 of FIG. 4. In lossy compression, a user interacts with the visualization tool to further consolidate the images/software components via the visualized interface of FIG. 4. In the direct interaction with the visualized interface of FIG. 4, the user may initiate collapsing of rows of the matrix, collapsing of columns, (both by either an automatic algorithm 170 collapsing of rows or columns that are more similar that a value THESHOLD_LOSSY, or by hand-picking rows or columns that should be collapsed and merged), a substituting of components, and/or adapting the similarity functions used in the similarity comparison.

In one embodiment, for the user initiated collapsing of rows of the matrix/collapsing of columns, a context menu may be provided such that, via the visualization interface, a user may point or hover at a dendogram bridge, and 1.) after a right-click over a dendogram bridge, generate for display user-selectable functions in a context menu to: 'select these image bundles' or 'collapse these image bundles'. Likewise, a user may initially select an image bundle for collapsing, etc., by 2.) after a right-click over an image bundle, generate for display a user-selectable function to: 'select these image bundles'

The result of a 'select . . . ' is that, for (1.) the set of image bundles contained by the selected dendogram bridge becomes highlighted (e.g. with a colored (e.g., yellow) or highlighted halo), or for (2.) the selected image bundle becomes highlighted. The user can continue adding sets of bundles (1.) or bundles (2.) to the highlighted set. Then, a user can select from a (top) menu: "collapse highlighted bundles". The same mechanism may be similarly used for collapsing software component bundles.

For the software component substitution, thus, in one embodiment, via the visualization interface, a user may right-click on a component bundle, and the system may responsively generate for display a user-selectable function in a context menu for which one of the entries is: "substitute components". This would invoke functionality to bring up a list with all the components in a bundle, saying "Select a component to substitute". The user could then select a component and replace it with a new component name.

Thus, for example, responsive to the information displayed by user interaction with the visualization interface shown of FIG. 4, a user can perform a lossy compression by initiating combining of similar (i.e., non-identical) images together on the vertical axis, or combining of similar (i.e., non-identical) software components on the horizontal axis. With respect to the provision of a collapsing rows function, a user initiates a collapse of rows that are deemed similar enough so they can be treated as one image bundle. In various embodiments, the user can collapse two or more rows in the visualization in the following ways: For example, the user can right-click on a horizontal line in the image bundle dendogram and select from a displayed menu choice a function to "Collapse image bundles" that unites all image bundles in the (sub)tree given by the dendogram connector into one row. This can potentially be the whole cluster. The user further can manually pick two or more image bundles (rows) and then issue the command "Collapse these image bundles" to unite the select image bundles into one row.

With respect to the provision of a collapsing column function, a user may initiate collapse of two software component bundles (columns) together, when these bundles are supposed to be installed together. In various embodiments, the user can collapse two or more rows in the visualization in the following ways: For example, the user can right-click on a horizontal line in the image bundle dendogram and select "Collapse image bundles" to unite all image bundles in the subtree given by the dendogram connector into one row. The user further can manually pick two or more image bundles (rows) and then issue the command "Collapse image bundles" to unite the select image bundles into one row.

With respect to the provision of a substituting components function, a user may initiate functionality to substitute certain components with other components. For example, if multiple minor versions of a software package (e.g., version 4.2, 4.3, 4.4) are present, the user may decide to upgrade all installations to the latest minor version (in this example—version 4.4). The user can achieve this by selecting one or more (outdated) software components 320 (e.g., in the list at the top of the visualization) and indicate the target software component. Doing so will trigger a re-clustering of the visualization—and as it will now have fewer components, it can be expected to have fewer columns. It is also expected to have fewer image bundles (rows), since images that before were different e.g., because of minor versions in their components will now be identical.

With respect to the provision of adapting the similarity functions, as mentioned, the similarity function between image bundle rows and software component bundle columns is used to determine the similarity between 2 rows or columns during the clustering algorithm. It can also be informative to the user to know how difficult it would be to consolidate different images. A simple similarity can be defined by using the Jaccard index distance between 2 vectors. However, in a further embodiment, other metrics or heuristics can be applied. For example, one heuristic may take into account the difficulty of replacing one component with another when comparing two component bundles: typically, upgrading minor versions of software components is easy, and should be assigned a high similarity. Upgrading to a new major version is more difficult, and has a lower similarity.

As additionally shown in FIG. 5, in the resulting consolidated visualization interface 500 corresponding to the visualization interface 300 of FIG. 4, the displayed elements are shown further collapsed (e.g., combined) are rendered without loss of information, e.g., as solid cells, e.g., squares 508. Thus, for example, lossless compression may result in consolidated column vectors 509 showing a resulting combination of respective very similar software component bundles indicated by dendogram 385 of FIG. 4 for example clusters 330a, 330b, 330c, and 330e. Further, matrix elements that were collapsed with loss (different constituent elements) are rendered to appear as hollowed elements, e.g., hollowed cells 510 indicating lossy compression. Thus, for example, lossy compression may result in a consolidated column 520 showing a resulting lossy combination of respective software component bundles for example cluster 330d of FIG. 4. A tooltip can reveal the exceptions which can be used to detect outliers or anomalies and/or to generalize fuzzy patterns in the data.

With respect to the provision of generalizing fuzzy patterns, hollow cells 510 in the visualization points to similar patterns of software components installed on different images, however, being these patterns do not represent identical installation. For example when a program file X was removed by accident from a larger installation on an image, this program file X will manifest itself as a hollow cell in the visualization after lossy compression. Hovering over this hollow cell will inform the user that the majority of the image bundles has this program file X, but that X is absent in one specific image. This hollow cell 510 can now be selected and a command issued to "make the presence (or absence) of X uniform across the relevant images". This will cause X to be added to the image where it was missing. The user may then re-run the clustering and hopefully will see fewer columns and rows, making consolidation easier.

It is understood that the user can interact with the visualization interface in order to reduce the number of software components in a number of ways. Furthermore, fuzzy patterns can be generalized; components can be replaced or merged; and, similarity functions/heuristics can be adjusted. The steps of visualizing the clustering, visualizing the dendogram and performing lossy compression may be iterated until a satisfactory consolidation is obtained.

After interactive consolidation and clustering, the bundles represent potential new "golden master" images. That is, the consolidated groups that are similar are considered candidates as golden masters, i.e., a template that can be deployed to all of the machines to provide a single version of all the bundled software components. For example, machines that have the same software save for minor version differences (e.g., Websphere 5.4 versus a machine having a Websphere 5.5), a "golden master" (e.g., Websphere 5.5) may replace both applications in the cloud.

As mentioned, the data visualization method and tool is employed in a cloud computing environment 10 such as shown in view of FIG. 1. The cloud 10 represents infrastructure that can efficiently provide services, e.g., by taking advantage of virtualization and distributed computing. The cloud environment may be private computing cloud that is contained within the enterprise, but not limited to only a private cloud. The cloud environment may include enterprise level applications that provide the infrastructure enabling cloud computing services built by, for example, integrating multiple interrelated software component. The method and system described herein may be utilized when deploying a cloud computing management infrastructure.

The cloud environment may include components of a computer system that may include any computing node that is able to load and execute programmatic code, for instance, running the operating system and server application suite. The system logic may be embodied as computer executable code that is loaded from a remote source (e.g., from a network file system), local permanent optical (CD-ROM), magnetic storage (such as disk), or storage into memory for execution by a central processing unit, a processor and/or cores. A network interface may be used for communicating to other network accessible services. Such an interface may include, but is not limited to a hardwired device, e.g., Ethernet over coax cable, wireless IP, and telephone to IP (VoIP), or others. The memory may include computer readable instructions, data structures, program modules and application interfaces providing logic or functional components.

It should be understood, however, that the system and method of the present disclosure is not limited to only that configuration. Thus, the components may be distributed over a network on different platforms in a distributed environment, and/or configured in a cloud computing environment. The system may include multiple processors and/or cores.

Mirage™ provides a set of APIs that enable sophisticated operations directly on dormant images within an image repository, without having to first retrieve the image or instantiate and run it. It builds on semantic information about the disk image. Mirage searchability enables disk comparisons at file-level granularity.

Figure 7:
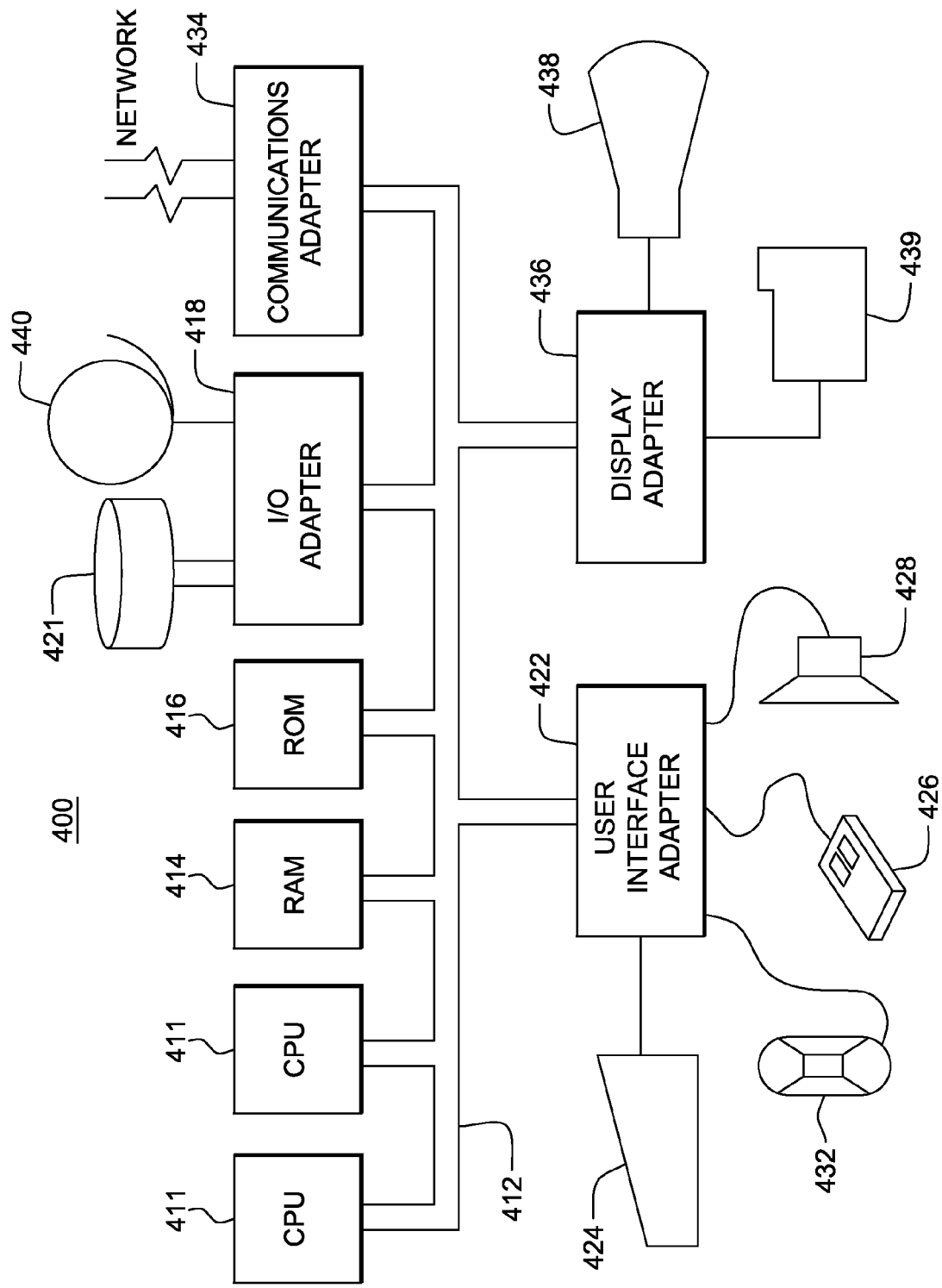
FIG. 7 illustrates an example of a computer system, in which the systems and methodologies of the present disclosure may be carried out or executed.

Referring now to FIG. 7, the systems and methodologies of the present disclosure may be carried out or executed in a computer system 400 that includes at least one processor or central processing unit (CPU) and/or cores 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse device 426, speaker 428, microphone 432, and/or other user interface device to the bus 412), a communication adapter 434 for connecting the system 400 to a data processing network, the Internet, an Intranet, or a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction. The containment (or storage) of the program may be non-transitory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for visualizing data associated with a cloud environment comprising:
    receiving data about images on computing machines or virtual images in cloud image repositories;
    receiving data about software components configured on said images;
    forming, from received data, a data structure that maps all images and configured software components on each image;
    generating, using a processor unit, a visualization interface of said data mapping on a display device in which images are represented visually along a first dimension of a matrix and software components are represented visually along a second dimension of said matrix, said generating including performing a hierarchical agglomerative clustering on said matrix, said performed hierarchical agglomerative clustering including:
        finding two most similar rows or columns in said matrix by running a lossless compression over said first dimension and over said second dimension, said lossless compression transforming said first dimension into image bundles, each of which represents a set of images that have identical software components;
        comparing a similarity value of the two most similar rows or columns against a threshold;
        if the similarity value is larger than the threshold, replacing the found two most similar rows or columns with a virtual image or a virtual software component bundle, and representing the replacement by a bridge in a dendrogram that shows a hierarchy of similarity between said images; and
        if the similarity value is smaller than or equal to the threshold, clustering similar images as groups and ranking the groups according to criteria;
    interacting, via a displayed visualization interface, to display information from said visualization data used for consolidating software components and images in said cloud environment.

2. The method as claimed in claim 1, further comprising:
    determining similarities between images on a first axis and similarities between software components on a second axis; and
    modifying visualizing of images in a first dimension and modifying visualization of software components in a second dimension based on said determined similarities.

3. The method as claimed in claim 2, further comprising:
    forming, for said visualization, one or more dendrograms in each dimension of said interface including one or more dendrograms indicating a degree of similarity between images in said first dimension, and one or more dendrograms indicating a similarity between software components in said second dimension.

4. The method as claimed in claim 1, wherein said lossless compression includes
    transforming two or more identical images in said first dimension of said interface into a single image bundle; and
    transforming two or more identical software components in said second dimension into a single software component bundle.

5. The method as claimed in claim 3, wherein said determining similarities between images in said first dimension and software components in said second dimension comprises performing a lossy compression, wherein, responsive to received user manipulation of said visualized data, said lossy compression comprising:
    synthesizing further image bundles along said first dimension by combining one or more non-identical images along said first dimension; and
    synthesizing further non-identical software component bundles by combining non-identical software components along said second dimension.

6. The method of claim 2, wherein said determining similarities between images in said first dimension and software components in said second dimension comprises:
    performing a clustering of images in a first dimension and a clustering of software components along said second dimension.

7. The method of claim 6, wherein said clustering of the software components includes performing said hierarchical agglomerative clustering using an adjustable similarity function.

8. The method of claim 5, wherein said formed dendrogram along a first dimension includes a bridge having a first component representing a synthesized image indicating combined functionality of the constituent images represented as a second visual components of the bridge.

9. The method of claim 8, further comprising:
    displaying, responsive to user interactions with displayed elements of said visualization interface, information useful for determining potential one or more non-identical images along said first dimension and potential non-identical software components along said second dimension for combining during said lossy compression.

10. A system for visualizing data associated with a cloud environment comprising:
a memory storage device;
a processor unit in communication with said memory storage device configured to perform a method to:
receive data about images on computing machines or virtual images in cloud image repositories;
receive data about software components configured on said images;
form, from received data, a data structure that maps all images and configured software components on each image;
generating a visualization interface of said data mapping on a display device in which images are represented visually along a first dimension of a matrix and software components are represented visually along a second dimension of said matrix, said generating including performing a hierarchical agglomerative clustering on said matrix, said performed hierarchical agglomerative clustering including:
finding two most similar rows or columns in said matrix by running a lossless compression over said first dimension and over said second dimension, said lossless compression transforming said first dimension into image bundles, each of which represents a set of images that have identical software components;
comparing a similarity value of the two most similar rows or columns against a threshold;
if the similarity value is larger than the threshold, replacing the found two most similar rows or columns with a virtual image or a virtual software component bundle, and representing the replacement by a bridge in a dendrogram that shows a hierarchy of similarity between said images; and
if the similarity value is smaller than or equal to the threshold, clustering similar images as groups and ranking the groups according to criteria;
receive user commands via interactions with said displayed visualization interface, to extract information from said visualization data for use in further consolidating software components and images in said cloud environment.

11. The system as claimed in claim 10, wherein said processor unit is further configured to:
determine similarities between images on a first axis and similarities between software components on a second axis; and
modify visualizing of images in a first dimension and modifying visualization of software components in a second dimension based on said determined similarities.

12. The system as claimed in claim 11, wherein said processor unit is further configured to:
form, for said visualization, one or more dendrograms in each dimension of said interface, including one or more dendrograms indicating a degree of similarity between images in said first dimension, and one or more dendrograms indicating a similarity between software components in said second dimension.

13. The system as claimed in claim 11, wherein said determining similarities between images in said first dimension and software components in said second dimension comprises performing the lossless compression wherein said processor unit is further configured to:
transform two or more identical images in said first dimension of said interface into a single image bundle; and
transform two or more identical software components in said second dimension into a software component bundle.

14. The system as claimed in claim 12, wherein said determining similarities between images in said first dimension and software components in said second dimension comprises performing a lossy compression, wherein, responsive to received user manipulation of said visualized data, said processor unit further configured to:
synthesize further single image bundles along said first dimension by combining one or more non-identical images along said first dimension; and
synthesize further non-identical software component bundles by combining non-identical software components along said second dimension.

15. The system as claimed in claim 11, wherein said determining similarities between images in said first dimension and software components in said second dimension comprises configuring a processor to: cluster the images in the first dimension and cluster the software components along said second dimension by performing the hierarchical agglomerative clustering using an adjustable similarity function.

16. The system as claimed in claim 14, wherein said formed dendrogram along a first dimension includes a bridge having a first component representing a synthesized image indicating combined functionality of the constituent images represented as a second visual components of the bridge.

17. The system as claimed in claim 16, wherein said processor unit is further configured to:
display, responsive to user interaction with displayed elements of said visualization interface, information useful for determining potential one or more non-identical images to combine along said first dimension and potential non-identical software components to combine along said second dimension during said lossy compression.

18. An article of manufacture comprising:
a tangible, non-transitory computer usable medium having computer readable program code embodied therein to execute machine instructions in a processing unit for visualizing data associated with a cloud environment the computer readable program code in said article of manufacture comprising computer readable program code for causing a computer to effect the steps of:
receiving data about images on computing machines or virtual images in cloud image repositories;
receiving data about software components configured on said images;
forming, from received data, a data structure that maps all images and configured software components on each image;
generating a visualization interface of said data mapping on a display device in which images are represented visually along a first dimension of a matrix and software components are represented visually along a second dimension of said matrix, said generating including performing a hierarchical agglomerative clustering on said matrix, said performed hierarchical agglomerative clustering including:
finding two most similar rows or columns in said matrix by running a lossless compression over said first dimension and over said second dimension, said lossless compression transforming said first dimension into image bundles, each of which represents a set of images that have identical software components;

comparing a similarity value of the two most similar rows or columns against a threshold;

if the similarity value is larger than the threshold, replacing the found two most similar rows with a virtual image or a virtual software component bundle, and representing the replacement by a bridge in a dendrogram that shows a hierarchy of similarity between said images; and if the similarity value is smaller than or equal to the threshold, clustering similar images as groups and ranking the groups according to criteria;

interacting, via a displayed visualization interface, to extract information from said visualization data used for consolidating software components and machine images in said cloud environment.

19. The article of manufacture as claimed in claim 18, further comprising computer readable program code for causing the computer to effect the step of:

determining similarities between images on a first axis and similarities between software components on a second axis; and modifying visualizing of images in a first dimension and modifying visualization of software components in a second dimension based on said determined similarities.

20. The article of manufacture as claimed in claim 19, further comprising computer readable program code for causing the computer to effect the step of:

forming, for said visualization, one or more dendrograms in each dimension of said interface including one or more dendrograms indicating a degree of similarity between images in said first dimension, and one or more dendrograms indicating a similarity between software components in said second dimension.

21. The article of manufacture as claimed in claim 19, wherein said determining similarities between images in said first dimension and software components in said second dimension comprises performing the lossless compression, said computer readable program code causing the computer to effect the steps of:

transforming two or more identical images in said first dimension of said interface into a single image bundle; and transforming two or more identical software components in said second dimension into a single software component bundle.

22. The article of manufacture as claimed in claim 19, wherein said determining similarities between images in said first dimension and software components in said second dimension comprises performing a lossy compression, wherein, responsive to received user manipulation of said visualized data, said computer readable program code causing the computer to effect the steps of:

synthesizing further image bundles along said first dimension by combining one or more non-identical images along said first dimension; and synthesizing further non-identical software component bundles by combining non-identical software components along said second dimension.

23. A data visualization tool comprising:

a memory storage device for storing first data representing images on computing machines or virtual images in cloud image repositories and storing second data about software components configured on each said image;

a processor device in communication with said memory storage device for forming, from said stored data, a data structure that maps all images and configured software components on each image, said processor device generating, from said stored data, a visualization interface for mapping said stored data on a display device in which images are represented visually along a first dimension of a matrix and software components are represented visually along a second dimension of said matrix, said generating including performing a hierarchical agglomerative clustering on said matrix, said performed hierarchical agglomerative clustering including:

finding two most similar rows or columns in said matrix by running a lossless compression over said first dimension and over said second dimension, said lossless compression transforming said first dimension into image bundles, each of which represents a set of images that have identical software components;

comparing a similarity value of the two most similar rows or columns against a threshold;

if the similarity value is larger than the threshold, replacing the found two most similar rows with a virtual image or a virtual software component bundle, and representing the replacement by a bridge in a dendrogram that shows a hierarchy of similarity between said images; and if the similarity value is smaller than or equal to the threshold, clustering similar images as groups and ranking the groups according to criteria;

said visualization interface including cell components located at intersections that map a particular image configured with a particular software component; and said visualization interface further including one or more dendrograms indicating a degree of similarity between images in said first dimension, and one or more dendrograms indicating a similarity between software components in said second dimension;

a device for initiating, via said interface, user interactions with displayed cell components or visual components of said one or more dendrograms, said processor device causing display of detailed information useful for consolidating software components and images in said cloud environment responsive to said user interactions, and, said processor device further effecting a compression of images along said first dimension and software components along said second dimension responsive to said user interactions.

* * * * *